(12) United States Patent
Shi

(10) Patent No.: US 11,074,295 B2
(45) Date of Patent: Jul. 27, 2021

(54) DISTRIBUTED GRAPH EMBEDDING METHOD AND APPARATUS, DEVICE, AND SYSTEM

(71) Applicant: Advanced New Technologies Co., Ltd., Grand Cayman (KY)

(72) Inventor: Leilei Shi, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/085,219

(22) Filed: Oct. 30, 2020

(65) Prior Publication Data

US 2021/0049209 A1   Feb. 18, 2021

Related U.S. Application Data

(63) Continuation of application No. PCT/CN2019/095340, filed on Jul. 10, 2019.

(30) Foreign Application Priority Data

Aug. 24, 2018   (CN) ......................... 201810975295.2

(51) Int. Cl.
  *G06F 7/00*  (2006.01)
  *G06F 16/901*  (2019.01)
  (Continued)

(52) U.S. Cl.
  CPC ...... *G06F 16/9024* (2019.01); *G06F 16/2237* (2019.01); *G06N 20/00* (2019.01)

(58) Field of Classification Search
  CPC .. G06F 16/9024; G06F 16/2237; G06N 20/00
  (Continued)

(56) References Cited

U.S. PATENT DOCUMENTS

2018/0247224 A1* 8/2018 Garcia Duran ........ G16H 50/20

FOREIGN PATENT DOCUMENTS

CN    103530604 A    1/2014
CN    105389324 A    3/2016
(Continued)

OTHER PUBLICATIONS

International Search Report of International Application No. PCT/CN2019/095340 dated Sep. 29, 2019.
(Continued)

*Primary Examiner* — Isaac M Woo
(74) *Attorney, Agent, or Firm* — Finnegan, Henderson, Farabow, Garrett & Dunner, LLP

(57) ABSTRACT

A distributed graph embedding method includes: when a preset sampling algorithm is used to perform path sampling on a graph data structure, adding an identification and a current embedding vector of a current sampled vertex to a predefined message data structure; when a data length of the message data structure reaches a window length defined by a word vector algorithm, using the word vector algorithm to calculate an update gradient of an embedding vector of each sampled vertex in an updated message data structure; based on identifications in the updated message data structure, sending each update gradient to a corresponding vertex respectively, and using update gradients to update the current embedding vectors of the sampled vertices that belong to a current computing node; and after a preset convergence condition is met, generating a graph embedding matrix by final embedding vectors of all vertices in the graph data structure.

15 Claims, 6 Drawing Sheets

(51) Int. Cl.
*G06F 16/22* (2019.01)
*G06N 20/00* (2019.01)

(58) Field of Classification Search
USPC .................................................. 707/600–899
See application file for complete search history.

(56) References Cited

FOREIGN PATENT DOCUMENTS

| | | | |
|---|---|---|---|
| CN | 105824802 A | 8/2016 |
| CN | 107633263 A | 1/2018 |
| CN | 107729290 A | 2/2018 |
| CN | 108062551 A | 5/2018 |
| CN | 108427773 A | 8/2018 |
| WO | WO 2013/112618 A1 | 8/2013 |

OTHER PUBLICATIONS

Written Opinion of the International Searching Authority issued in International Application No. PCT/CN2019/095340, dated Sep. 29, 2019.
European Search Report in European Application No. 19852888.7, dated May 3, 2021.
Wang, Lu et al., How to Partition a Billion-Node Graph, ICDE Conference 2014, IEEE, Mar. 31, 2014, pp. 568-579.

* cited by examiner

DISTRIBUTED GRAPH EMBEDDING METHOD AND APPARATUS, DEVICE, AND SYSTEM

CROSS-REFERENCE TO RELATED APPLICATIONS

This application is a continuation application of International Application No. PCT/CN2019/095340, filed on Jul. 10, 2019, which is based upon and claims priority to Chinese Patent Application No. 201810975295.2, filed on Aug. 24, 2018, the entire content of all of which is incorporated herein by reference.

TECHNICAL FIELD

The present specification relates to the field of data processing, and in particular, to a distributed graph embedding method and apparatus, a device, and a system.

BACKGROUND

A graph data structure is a data structure with a high degree of abstraction and strong expressive power: vertices (which may also be referred to as nodes) can be used to represent real-world entities, and relationships between the entities are reflected by edges between the vertices. Common graph data structures include social networks, commodity networks, knowledge graphs, user-commodity networks, and so on. Graph embedding is a method of graph calculation. It is a continuous, dense, and low-dimensional vector representation for learning the vertices. Relationships between the vertices can be measured by relationship between the vectors. For example, by using graph embedding learning algorithms such as Deep Walk and node2vec, a graph embedding matrix composed of vectors of vertices in the graph data structure can be generated. The graph embedding technology is often used for feature extraction because of the versatility of its results, and the results are further input to downstream tasks/projects. For example, social media extracts a user's graph embedding features for anti-cheat detection; e-commerce optimizes commodity recommendation tasks through graph embedding features of commodities; and content distributors optimize content recommendation tasks through graph embedding features of articles.

However, when performing large-scale graph embedding calculations on the graph data structure, since a graph embedding matrix will be loaded into a memory for calculation and the size of the graph embedding matrix is determined by the number of vertices in the graph data structure and the size of each vector, the graph embedding matrix needs a lot of memory when there are many vertices and the vector dimension is large, which often leads to memory overflow.

SUMMARY

According to a first aspect of embodiments of the present specification, there is provided a distributed graph embedding method, including: when a preset sampling algorithm is used to perform path sampling on a graph data structure, adding an identification and a current embedding vector of a current sampled vertex to a predefined message data structure, wherein identifications and current embedding vectors of sampled vertices in a sampling process are recorded in the message data structure, and the message data structure is obtained by transfer via a first computing node where a previous sampled vertex is located; when a data length of the message data structure reaches a window length defined by a word vector algorithm, using the word vector algorithm to calculate an update gradient of an embedding vector of each sampled vertex in an updated message data structure; based on identifications in the updated message data structure, sending each update gradient to a corresponding vertex respectively, and using update gradients to update the current embedding vectors of the sampled vertices that belong to a second computing node where the current sampled vertex is located; and after a preset convergence condition is met, generating a graph embedding matrix by final embedding vectors of all vertices in the graph data structure.

According to a second aspect of the embodiments of the present specification, there is provided a distributed graph embedding apparatus, including: a processor; and a memory storing instructions executable by the processor, wherein the processor is configured to: add an identification and a current embedding vector of a current sampled vertex to a predefined message data structure when a preset sampling algorithm is used to perform path sampling on a graph data structure, wherein identifications and current embedding vectors of sampled vertices in a sampling process are recorded in the message data structure, and the message data structure is obtained by transfer via a first computing node where a previous sampled vertex is located; use a word vector algorithm to calculate an update gradient of an embedding vector of each sampled vertex in an updated message data structure when a data length of the message data structure reaches a window length defined by the word vector algorithm; send each update gradient to a corresponding vertex, respectively, based on identifications in the updated message data structure, and use update gradients to update the current embedding vectors of the sampled vertices that belong to a second computing node where the current sampled vertex is located; and generate a graph embedding matrix by final embedding vectors of all vertices in the graph data structure after a preset convergence condition is met.

According to a third aspect of the embodiments of the present specification, there is provided a distributed graph embedding system, wherein the system includes at least two computing nodes, a graph data structure is stored in the system in a distributed manner, and any one of the computing nodes performs a method including: when a preset sampling algorithm is used to perform path sampling on the graph data structure, adding an identification and a current embedding vector of a current sampled vertex to a predefined message data structure, wherein identifications and current embedding vectors of sampled vertices in a sampling process are recorded in the message data structure, and the message data structure is obtained by transfer via the computing node where a previous sampled vertex is located; when a data length of the message data structure reaches a window length defined by a word vector algorithm, using the word vector algorithm to calculate an update gradient of an embedding vector of each sampled vertex in an updated message data structure; based on identifications in the updated message data structure, sending each update gradient to a corresponding vertex respectively, and using update gradients to update the current embedding vectors of the sampled vertices that belong to the current computing node; and after a preset convergence condition is met, constituting a graph embedding matrix by final embedding vectors of all vertices in the graph data structure.

According to a fourth aspect of the embodiments of the present specification, there is provided a non-transitory computer-readable storage medium having stored therein instructions that, when executed by a processor of a device, cause the device to perform a distributed graph embedding method, the method including: when a preset sampling algorithm is used to perform path sampling on a graph data structure, adding an identification and a current embedding vector of a current sampled vertex to a predefined message data structure, wherein identifications and current embedding vectors of sampled vertices in a sampling process are recorded in the message data structure, and the message data structure is obtained by transfer via a first computing node where a previous sampled vertex is located; when a data length of the message data structure reaches a window length defined by a word vector algorithm, using the word vector algorithm to calculate an update gradient of an embedding vector of each sampled vertex in an updated message data structure; based on identifications in the updated message data structure, sending each update gradient to a corresponding vertex respectively, and using update gradients to update the current embedding vectors of the sampled vertices that belong to a second computing node where the current sampled vertex is located; and after a preset convergence condition is met, generating a graph embedding matrix by final embedding vectors of all vertices in the graph data structure.

The technical solution provided by the embodiments of the present specification may include the following beneficial effects.

By applying the embodiments of the present specification, the graph data structure is distributed in at least two computing nodes, and a plurality of computing nodes are configured to store and calculate the embedding vectors of the vertices, so that there is no need of storing the embedding vectors of all the vertices in the same computing node during calculation, and memory consumption can be dispersed to the maximum degree; and meanwhile, the vertices distributed in different computing nodes can also perform corresponding vector calculations by way of message propagation.

It should be understood that the above general description and the following detailed description are only exemplary and explanatory, and do not limit the present specification.

BRIEF DESCRIPTION OF THE DRAWINGS

The drawings herein are incorporated into the present specification and constitute a part of the present specification, show embodiments consistent with the present specification, and are used to explain the principles of the present specification together with the specification.

DETAILED DESCRIPTION

Figure 1:
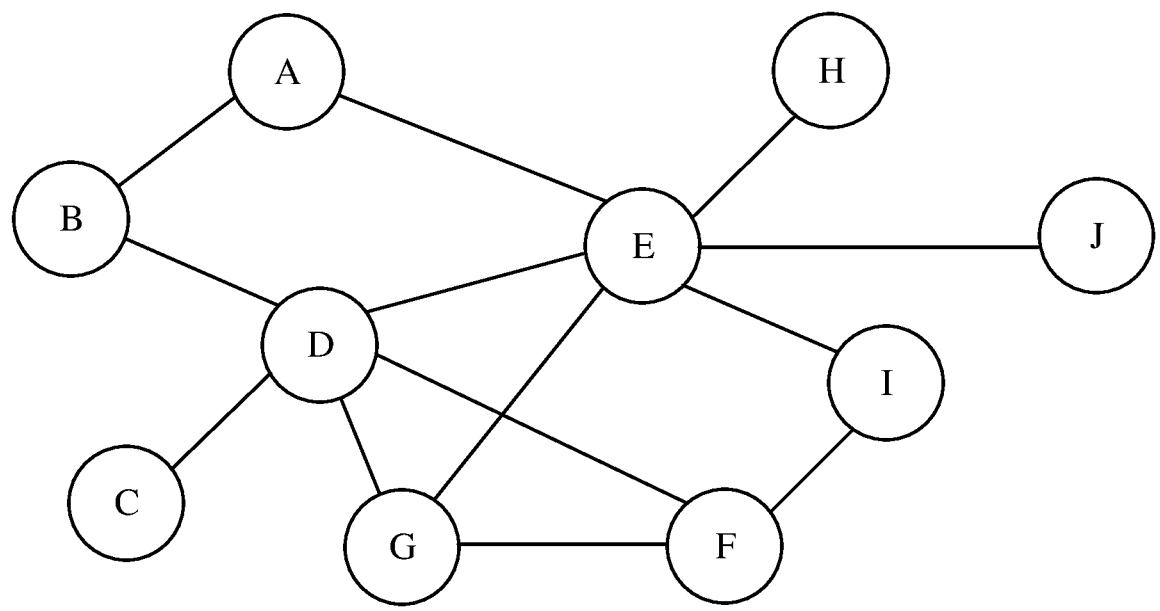
FIG. 1 is a network diagram according to an example embodiment.

Example embodiments will be described in detail here, examples of which are shown in the drawings. When the following description refers to the accompanying drawings, unless otherwise indicated, the same numerals in different drawings represent the same or similar elements. The implementations described in the following example embodiments do not represent all implementations consistent with the present specification. Rather, they are merely examples of apparatuses and methods consistent with some aspects of the present specification as recited in the appended claims.

The terminology used in the present specification is for the purpose of describing particular embodiments only, and is not intended to limit the present specification. For example, the terms "first," "second," etc. may be used to describe various information in the present specification, the information should not be limited to these terms. These terms are only used to distinguish the same type of information from each other. For example, without departing from the scope of the present specification, first information may also be referred to as second information, and similarly, second information may also be referred to as first information.

In embodiments of the present specification, a graph data structure is a data structure with a high degree of abstraction and strong expressive power. Generally, in graph calculation, a basic data structure expression may be: $G=(V, E, D)$, V=vertex (vertex or node), E=edge, D=data (weight or other attribute information). Many data issues in the physical world may be expressed in an abstraction way by the graph data structure, such as social networks, commodity networks, knowledge graphs, user-commodity networks, etc. The graph data structure well expresses the relationships between data, and the relationship calculation is the core of big data calculation, i.e., by obtaining the data relationships, useful information can be extracted from massive data with a lot of noise. For example, by modeling the relationship between shoppers, users with similar interests can be quickly found and recommended with commodities; or in social networks, opinion leaders are found by a transmission relationship.

For example, for add-on business, a graph may be constructed based on user purchase behaviors, nodes: commodities, edges: the behavior of simultaneous purchases of commodities, and weights: the proportion of simultaneous purchases, which may be characteristics such as the number of purchases, purchase time, amount of money, etc. FIG. 1 is an example of a network diagram provided by one or more embodiments of the present specification. In this example, vertex A to vertex J are used to represent commodities, and connection lines between the vertices may be used to represent the behavior of simultaneous purchases of the commodities. It can be understood that FIG. 1 is for illustration only, and an actual network diagram may be determined according to business requirements. After a network diagram is constructed based on user purchase behaviors, the user purchase behaviors may be sampled based on weights as candidates for positive samples. Negative samples are randomly sampled from non-purchase user behaviors. The samples are used to train a supervised model to obtain a model for recommending add-on commodities for a user.

Graph embedding is a graph calculation method, which can embed the vertices (nodes) in the graph into computable vectors, and the vertex vectors can form a graph vector matrix. However, when a large scale of graph embedding calculations are performed on the graph data structure in the related art, the graph embedding matrix requires a lot of memory, which often results in memory overflow.

The present specification provides a solution for dispersing memory consumption in the distributed computing nodes to the greatest extent, which will greatly reduce the calculation bottleneck caused by memory consumption in calculation. The embodiments of the present specification are illustrated below with reference to the accompanying drawings.

Figure 2A:
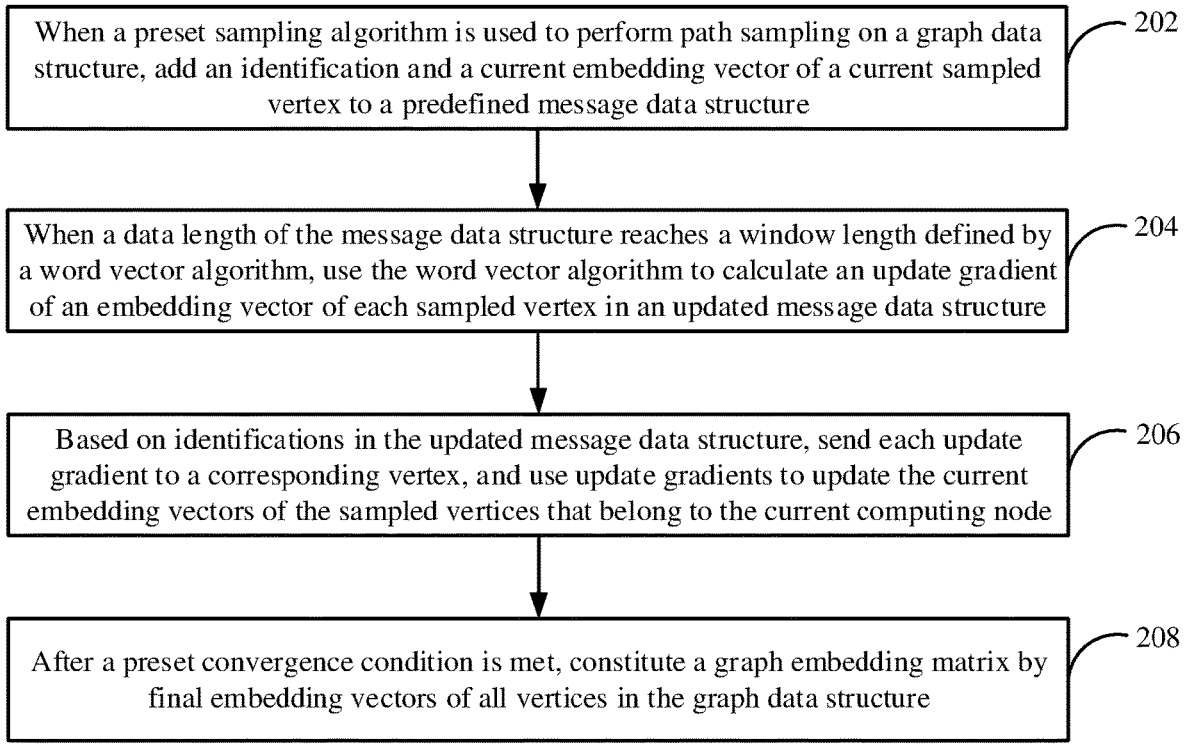
FIG. 2A is a flowchart of a distributed graph embedding method according to an example embodiment.

FIG. 2A is a flowchart of a distributed graph embedding method according to an example embodiment. In the example embodiment, a graph data structure is distributed in at least two computing nodes. Referring to FIG. 2A, the method includes the following steps.

In step 202, when a preset sampling algorithm is used to perform path sampling on the graph data structure, an identification and a current embedding vector of a current sampled vertex are added to a predefined message data structure, wherein identifications and current embedding vectors of sampled vertices in a sampling process are recorded in the message data structure, and the message data structure is obtained by transfer via the computing node where a previous sampled vertex is located.

In step 204, when a data length of the message data structure reaches a window length defined by a word vector algorithm, the word vector algorithm is used to calculate an update gradient of an embedding vector of each sampled vertex in an updated message data structure.

In step 206, based on identifications in the updated message data structure, each update gradient is respectively sent to a corresponding vertex, and the update gradients are used to update the current embedding vectors of the sampled vertices that belong to the current computing node.

In step 208, after a preset convergence condition is met, a graph embedding matrix is constituted, e.g., generated by final embedding vectors of all vertices in the graph data structure.

Figure 2B:
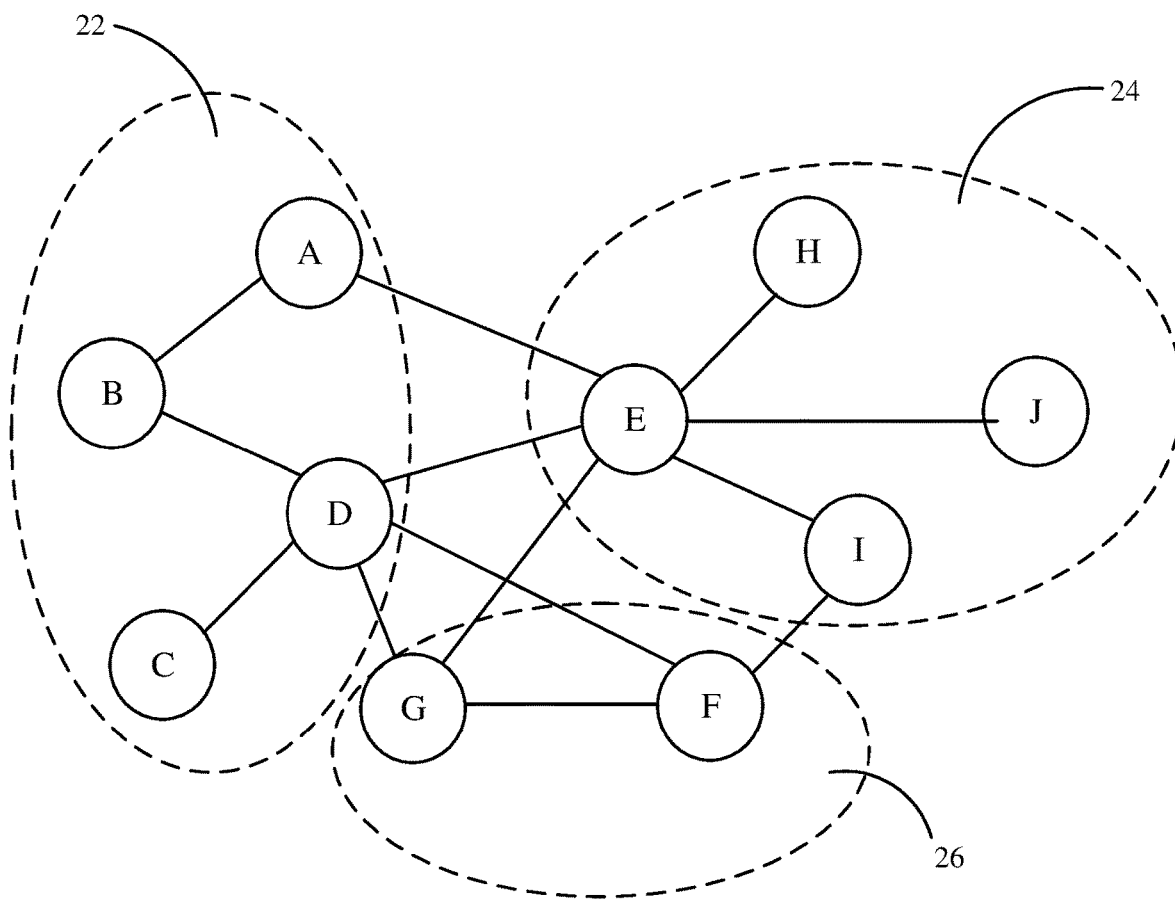
FIG. 2B is a schematic diagram of distribution of a graph data structure according to an example embodiment.

The distributed graph embedding method of the present embodiment may be applied to a distributed system including at least two computing nodes. For example, FIG. 2B is a schematic diagram of distribution of a graph data structure according to an example embodiment. In FIG. 2B, vertices A, B, C, and D may be stored on a computing node 22, vertices E, H, I, and J may be stored on a computing node 24, and vertices G and F may be stored on a computing node 26. The graph data structure is distributed in at least two computing nodes, and a plurality of computing nodes are configured to store and calculate the embedding vectors of the vertices, so that there is no need of storing the embedding vectors of all the vertices in the same computing node during calculation, and memory consumption can be dispersed to the maximum degree; and meanwhile, the vertices distributed in different computing nodes can also perform corresponding vector calculations by way of message propagation.

The graph data structure may be created based on different business requirements, for example, it may be a social network, a commodity network, a knowledge graph, a user-commodity network, and so on. The preset sampling algorithm may be an algorithm for mining the relationship between the vertices, and a vertex sequence (which may also be referred to as a node sequence) may be obtained by sampling through the preset sampling algorithm. For example, the preset sampling algorithm may be random sampling in the form of Deep Walk, or biased sampling in the form of node2vec, or other sampling methods. This method may be applied to different vertex/path sampling algorithms.

In the process of path sampling on the graph data structure by using the preset sampling algorithm, when the current sampled vertex is determined, the identification and the current embedding vector of the current sampled vertex may be added to the predefined message data structure. For illustrative purposes only, the vertex determined by the current sampling may be referred to as the current sampled vertex. The identification may be an identification for uniquely identifying the current sampled vertex; for example, it may be a vertex ID. The current embedding vector may be an embedding vector stored in the current sampled vertex at the moment. For example, when the current sampled vertex is sampled for the first time, the current embedding vector may be an initial embedding vector. The initial embedding vector of each vertex is obtained by initializing the graph data structure. In a training process, the embedding vector of the vertex will be updated. Therefore, when the current sampled vertex is sampled not for the first time, the current embedding vector may be the embedding vector obtained in the last update. The embedding vector may be a vectorized feature representation. The current embedding vector of a vertex in the graph data structure is stored in graph vertex data of the computing node where the vertex is located, and the graph embedding vector is directly stored in the graph vertex data and distributed in all the computing nodes so as to reduce the memory consumption of the same computing node.

In the example embodiment, the message data structure is a specific data structure configured to transfer data during the calculation of the embedding vector, and may also be referred to as a path window message. For example, the message data structure may be a data structure such as a linked list or a list. The graph data structure is distributed in at least two computing nodes, different computing nodes store vertex data of different vertices respectively, and the same vertex sequence may be distributed in different computing nodes. Therefore, by way of message data structure propagation, data transfer between the different computing nodes may be realized for updating the vertex embedding vectors.

In the example embodiment, the identifications and the current embedding vectors of the sampled vertices are recorded in the message data structure, and the message data structure may be transferred between the sampled vertices. For example, the message data structure may be obtained by sending from the computing node where the previous sampled vertex is located. If the previous sampled vertex and the current sampled vertex are in the same computing node, the computing node may directly add the identification and the current embedding vector of the current sampled vertex to the message data structure. If the previous sampled vertex and the current sampled vertex are not in the same computing node, then the computing node where the previous sampled vertex is located sends the message data structure to the computing node where the current sampled vertex is located, and the computing node where the current sampled vertex is located may add the identification and the current embedding vector of the current sampled vertex to the message data structure.

For example, in one embodiment, when the data length of the message data structure does not reach the window length defined by the word vector algorithm, a vertex adjacent to and connected to the current sampled vertex is sampled by using the preset sampling algorithm, and the updated message data structure is sent to the computing node where the determined sampled vertex is located.

In the example embodiment, the message data structure may be transferred between the vertices to avoid the situation where the same vertex sequence is distributed in different computing nodes and consequently the vertex embedding vectors cannot be calculated.

One of the functions of the message data structure is to calculate the update gradient of the embedding vectors of the vertices in the same vertex path. Therefore, the upper limit of the number of sampled vertices in the message data structure is much smaller than the number of all vertices in the graph data structure. The identifications and the current embedding vectors of the sampled vertices are used as a set of data for the sampled vertices. The number of sampled vertices in the so-called message data structure may be the number of data sets.

In one embodiment, the upper limit of the data length of the message data structure may be determined according to the window length defined by the word vector algorithm. The data length of the message data structure may be the number of current embedding vectors in the message data structure. In one example, the upper limit of the data length of the message data structure may be the window length; and in another example, the upper limit of the data length of the message data structure may be slightly larger than the window length.

The message data structure may be a dynamic linked list or list, and may execute an adding or deleting operation along with message transfer to ensure that the current length of the message data structure does not exceed the upper limit of the length.

In one embodiment, the upper limit of the data length of the message data structure is the window length, and the method further includes: when the data length of the message data structure reaches or is greater than the window length defined by the word vector algorithm, an identification and a current embedding vector of the earliest added sampled vertex in the message data structure are deleted.

In the present embodiment, the principle of first added first deleted may be adopted, and when the data length of the message data structure reaches or is greater than the window length defined by the word vector algorithm, data in the message data structure may be deleted according to adding time of the data. For example, the identification and the current embedding vector of the earliest added sampled vertex in the message data structure are deleted, so that only the vertex data within the window length are retained and communicated and dynamically updated, thereby reducing unnecessary memory consumption caused by storing training samples.

Further, in order to improve the deletion efficiency, the identifications and the current embedding vectors of the sampled vertices may be stored in the order of addition. For example, the first-added identification and current embedding vector are added to the header of the message data structure, and then subsequently added identifications and current embedding vectors are added to the tail of the current message data structure, so that the identifications and the current embedding vectors of the sampled vertices are arranged in the order of addition.

When the data length of the message data structure reaches the window length defined by the word vector algorithm, the word vector algorithm may be used to calculate the update gradient of the embedding vector of each sampled vertex in the updated message data structure.

In some embodiments, the word vector algorithm may be a conventional algorithm, such as a tool for calculating word vectors. For example, the SkipGram or CBoW algorithm may be used to calculate the update gradients of the embedding vectors, other word vector algorithms may also be used, and a custom loss function may also be supported to calculate the update gradients of the embedding vectors.

Based on the identifications in the updated message data structure, each update gradient is respectively sent to a corresponding vertex, and the update gradients are used to update the current embedding vectors of the sampled vertices through the computing nodes where the vertices are located.

Each training is an update to the vertex embedding vectors. After multiple rounds of training, the vertex embedding vectors may be updated to a relatively stable state. Therefore, the vertex embedding vectors may need to be adjusted in each training. The gradients (which may be referred to as update gradients) of the embedding vectors are calculated. Because the gradients are also vectors, the current embedding vectors are added with or subtracted by the gradients, and thus the current embedding vectors are updated.

The preset convergence condition in step 208 may be a condition that makes the embedding vectors stable. For example, it may be that sliding windows in all vertex sequences reach a preset number of training steps (e.g., iteration steps).

Further, different vertex sequences may update the embedding vectors at the same time. Different vertex sequences may be different vertex sequences in the same computing node, or different vertex sequences in different computing nodes.

In the above embodiments, the graph embedding vector is used as part of the vertex data and stored in each computing node in a distributed manner to avoid memory bottleneck caused by a single computing node. Meanwhile, since only the vertex data within the window length are retained and communicated and dynamically updated, unnecessary memory consumption caused by storing training samples can be reduced.

Further, the present specification also provides an application of the graph embedding matrix. In one embodiment, a training sample may be constructed by using the graph embedding matrix based on a preset task, and a preset model is trained by using the constructed training sample to obtain a model for processing the preset task. For example, if the graph data structure is a commodity network graph, the preset task may be a commodity recommendation task and so on.

The various technical features in the above implementations can be arbitrarily combined, as long as there is no conflict or contradiction between the combinations of the features.

Figure 3:
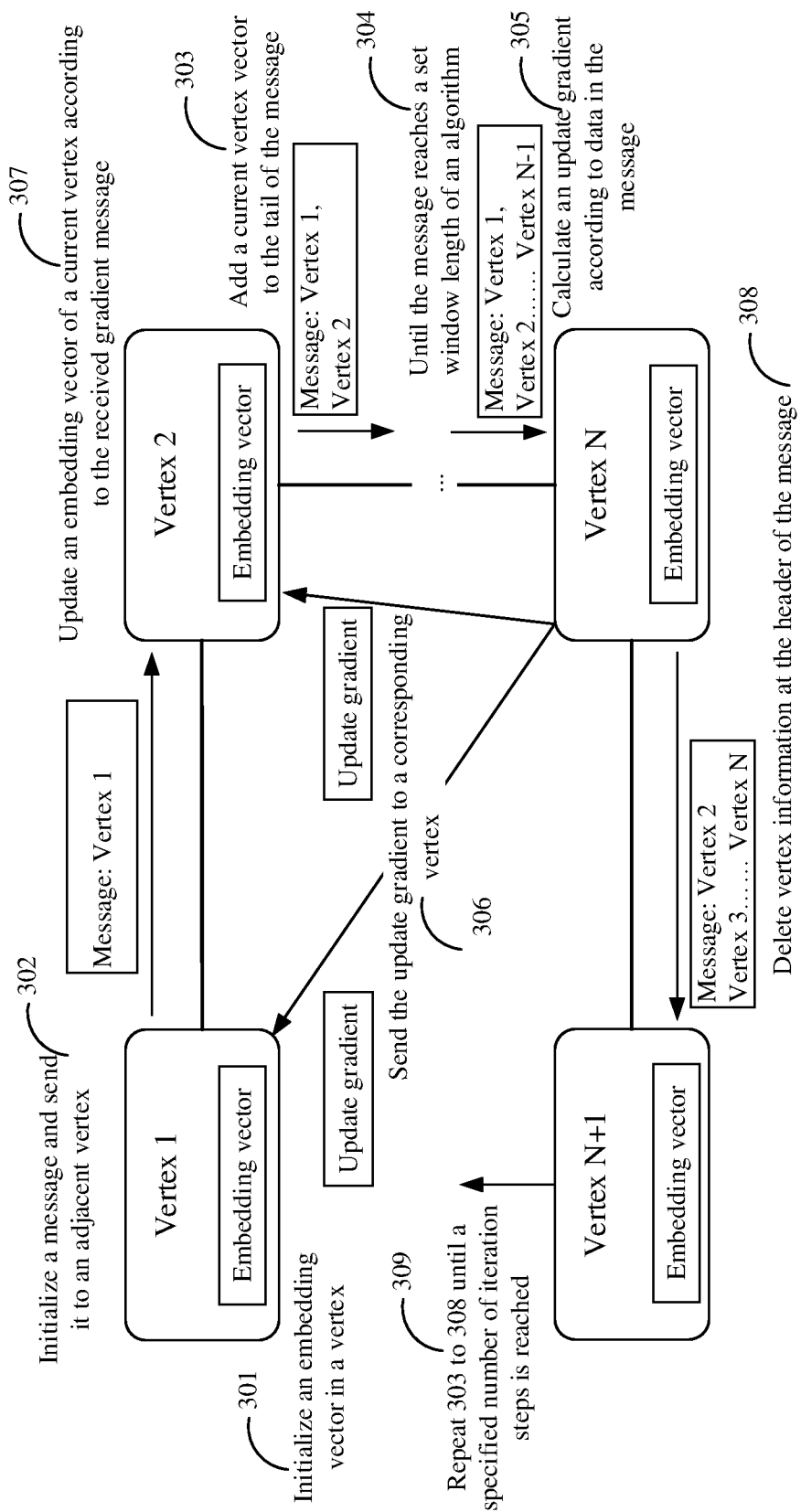
FIG. 3 is a schematic diagram of a distributed graph embedding method according to an example embodiment.

FIG. 3 is a schematic diagram of another distributed graph embedding method according to an example embodiment. Some of the vertices are shown in FIG. 3, and vertex 1 to vertex N+1 may be stored in different computing nodes in a distributed manner.

In step 301, a graph data structure is initialized to obtain an initial embedding vector of each vertex, and the initial embedding vectors are stored in a vertex data structure.

In step 302, a preset sampling algorithm is used to perform path sampling on the graph data structure, and assuming that a determined sampled vertex is vertex 1, the computing node where vertex 1 is located adds a vertex ID and an initial embedding vector of vertex 1 to the header of a message data structure. When a data length of the message data structure does not reach a window length defined by a Skip Gram/CboW algorithm, an adjacent vertex continues to be sampled, and an updated message data structure is sent to the determined sampled vertex. Assuming that the sampled vertex is vertex 2, the computing node where vertex 1 is located sends the updated message data structure to the computing node where vertex 2 is located.

In step 303, the computing node where vertex 2 is located adds a vertex ID and a current embedding vector of vertex 2 to the tail of the message data structure. For example, the message data structure is: an array of vertex 1 (ID and current embedding vector) and an array of vertex 2 (ID and current embedding vector). When the data length of the message data structure does not reach the window length defined by the Skip Gram/CboW algorithm, an adjacent vertex continues to be sampled, and the updated message data structure is sent to the determined sampled vertex.

In step 304, the addition operation of the message data structure and the data length judgment operation are repeated until the data length of the message data structure reaches the window length defined by the Skip Gram/CboW algorithm.

In step 305, assuming that after the computing node where vertex N is located adds a vertex ID and a current embedding vector of vertex N to the tail of the message data structure, the data length of the message data structure reaches the window length defined by the Skip Gram/CboW algorithm, an update gradient of the embedding vector of each vertex in the message data structure is calculated according to the Skip Gram/CBoW algorithm.

In step 306, the computing node where vertex N is located sends the update gradient to a corresponding vertex.

In step 307, after the update gradient is received by the computing node where the corresponding vertex is located, the update gradient is used to update the embedding vector of the vertex.

In step 308, the vertex data in the header of the message data structure are deleted, and the message data structure is sent to the vertex determined by sampling, so that the computing node where the vertex is located adds an identification and a current embedding vector of the vertex to the message data structure.

In step 309, the steps 303 to 308 above are repeated until the specified number of training steps is reached.

In the above embodiment, the graph embedding vector is directly stored in the graph vertex data and distributed in all the computing nodes. While path sampling is performed on a graph, training samples are dynamically generated for training, thereby reducing memory consumption.

Figure 4:
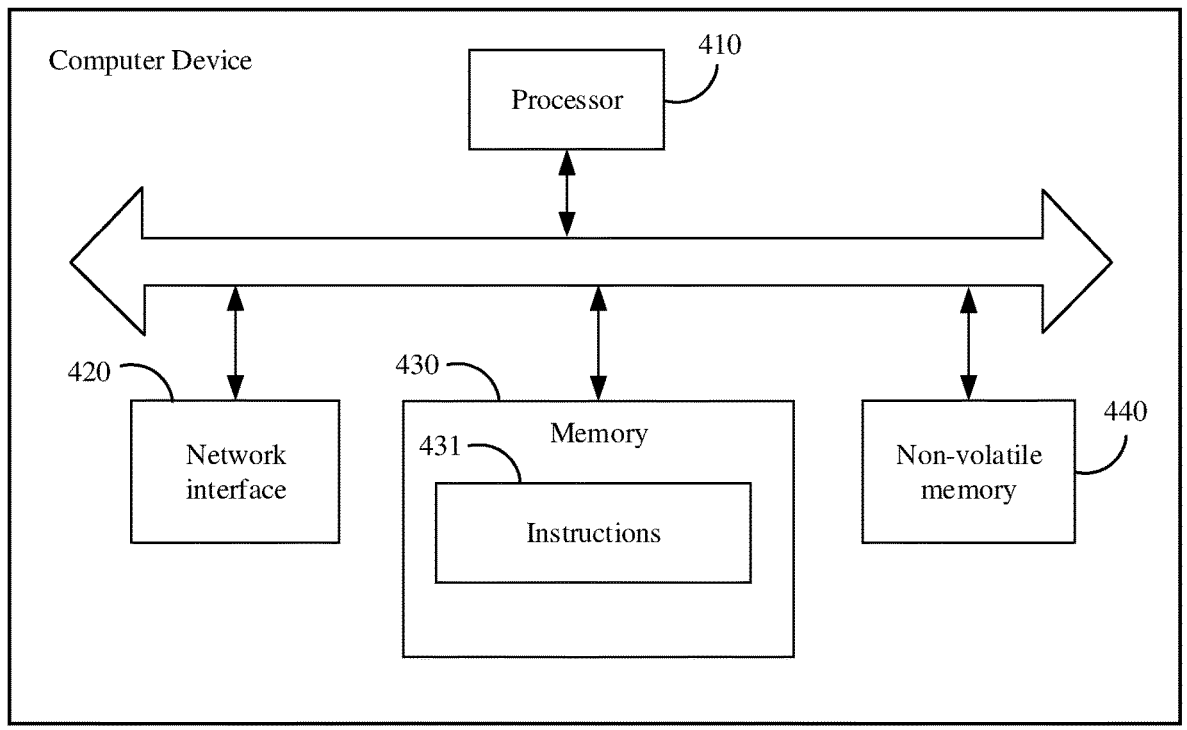
FIG. 4 is a schematic diagram of a computer device for implementing a distributed graph embedding method, according to an example embodiment.

Embodiments of the present specification also provide apparatus a computer device for implementing the distributed graph embedding method described above. FIG. 4 is a schematic diagram of the computer device according to an example embodiment. Referring to FIG. 4, the computer device includes a processor 410, a network interface 420, a memory 430, and a non-volatile memory 440. The memory 430 includes instructions, when executed by the processor 410, for implementing the distributed graph embedding method described above.

Figure 5:
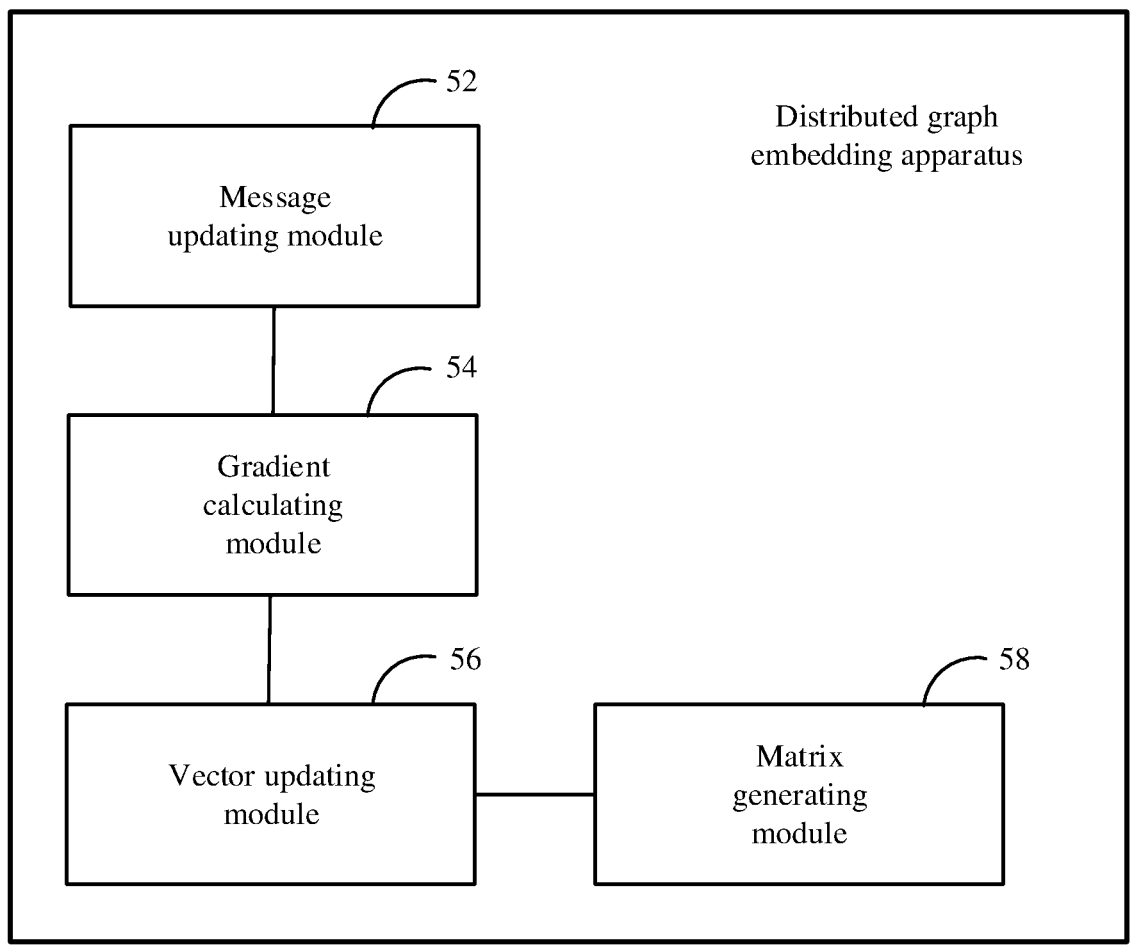
FIG. 5 is a block diagram of a distributed graph embedding apparatus according to an example embodiment.

FIG. 5 is a block diagram of a distributed graph embedding apparatus according to an example embodiment. In the example embodiment, a graph data structure is distributed in at least two computing nodes, and the apparatus is arranged on one of the computing nodes. Referring to FIG. 5, the distributed graph embedding apparatus includes: a message updating module 52, a gradient calculating module 54, a vector updating module 56, and a matrix generating module 58. Each of the modules may be implemented by software, or hardware, or a combination of hardware and software. For example, the module may be formed by reading corresponding computer program instructions in a non-volatile memory into a memory for running through a processor of the computer device where it is located.

The message updating module 52 is configured to add an identification and a current embedding vector of a current sampled vertex to a predefined message data structure when a preset sampling algorithm is used to perform path sampling on the graph data structure, wherein identifications and current embedding vectors of sampled vertices in a sampling process are recorded in the message data structure, and the message data structure is obtained by transfer via the computing node where a previous sampled vertex is located.

The gradient calculating module 54 is configured to use a word vector algorithm to calculate an update gradient of an embedding vector of each sampled vertex in an updated message data structure when a data length of the message data structure reaches a window length defined by the word vector algorithm.

The vector updating module 56 is configured to respectively send each update gradient to a corresponding vertex based on identifications in the updated message data structure, and use the update gradients to update the current embedding vector of the sampled vertex belonging to the current computing node.

The matrix generating module 58 is configured to generate a graph embedding matrix by final embedding vectors of all vertices in the graph data structure after a preset convergence condition is met.

In one embodiment, the current embedding vectors of the vertices in the graph data structure are stored in graph vertex data of the computing nodes where the vertices are located.

In one embodiment, the apparatus further includes: a vertex sampling module configured to sample a vertex adjacent to and connected to the current sampled vertex by using the preset sampling algorithm when the data length of the message data structure does not reach the window length defined by the word vector algorithm; and an information transmission module configured to send the updated message data structure to the computing node where a determined sampled vertex is located.

In one embodiment, an upper limit of the data length of the message data structure is the window length, and the message updating module is further configured to: delete an identification and a current embedding vector of the earliest added sampled vertex in the message data structure when the data length of the message data structure reaches or is greater than the window length defined by the word vector algorithm.

In one embodiment, the apparatus further includes a task model determining module configured to: construct a training sample by using the graph embedding matrix based on a preset task, and train a preset model by using the constructed training sample to obtain a model for processing the preset task.

The apparatus embodiments correspond to the method embodiments, and reference may be made to the description of the method embodiments for relevant parts. The apparatus embodiments described above are only examples, where the modules described as separate components may or may not be physically separated, and the components displayed as modules may be located in one place, or may be distributed to a plurality of networks. Part or all of the modules may be selected according to actual needs.

Embodiments of the present specification further provide a computer device including a processor, and a memory storing instructions executable by the processor, wherein a graph data structure is distributed in at least two computing nodes, and the processor is configured to: when a preset sampling algorithm is used to perform path sampling on the graph data structure, add an identification and a current embedding vector of a current sampled vertex to a predefined message data structure, wherein identifications and current embedding vectors of sampled vertices in a sampling process are recorded in the message data structure, and the message data structure is obtained by transfer via the computing node where a previous sampled vertex is located; when a data length of the message data structure reaches a window length defined by a word vector algorithm, use the word vector algorithm to calculate an update gradient of an embedding vector of each sampled vertex in an updated message data structure; based on identifications in the updated message data structure, send each update gradient respectively to a corresponding vertex, wherein the update gradients are used to update the current embedding vector of the sampled vertex belonging to the current computing node; and after a preset convergence condition is met, generate a graph embedding matrix by final embedding vectors of all vertices in the graph data structure.

Embodiments of the present specification further provide a non-transitory computer-readable storage medium having stored therein instructions that, when executed by a processor of a device, cause the device to perform a distributed graph embedding method, including: when a preset sampling algorithm is used to perform path sampling on a graph data structure, adding an identification and a current embedding vector of a current sampled vertex to a predefined message data structure, wherein identifications and current embedding vectors of sampled vertices in a sampling process are recorded in the message data structure, and the message data structure is obtained by transfer via a computing node where a previous sampled vertex is located; when a data length of the message data structure reaches a window length defined by a word vector algorithm, using the word vector algorithm to calculate an update gradient of an embedding vector of each sampled vertex in an updated message data structure; based on identifications in the updated message data structure, sending each update gradient respectively to a corresponding vertex, wherein the update gradients are used to update the current embedding vector of the sampled vertex belonging to the current computing node; and after a preset convergence condition is met, generating a graph embedding matrix by final embedding vectors of all vertices in the graph data structure.

Embodiments of the present specification further provide a distributed graph embedding system, wherein the system includes at least two computing nodes, a graph data structure is stored in the system in a distributed manner, and each of the computing nodes may perform a distributed graph embedding method, including: when a preset sampling algorithm is used to perform path sampling on the graph data structure, adding an identification and a current embedding vector of a current sampled vertex to a predefined message data structure, wherein identifications and current embedding vectors of sampled vertices in a sampling process are recorded in the message data structure, and the message data structure is obtained by transfer via the computing node where a previous sampled vertex is located; when a data length of the message data structure reaches a window length defined by a word vector algorithm, using the word vector algorithm to calculate an update gradient of an embedding vector of each sampled vertex in an updated message data structure; based on identifications in the updated message data structure, sending each update gradient respectively to a corresponding vertex, wherein the update gradients are used to update the current embedding vector of the sampled vertex belonging to the current computing node; and after a preset convergence condition is met, generating a graph embedding matrix by final embedding vectors of all vertices in the graph data structure.

Some embodiments of the present specification may take the form of computer program products implemented on one or more storage media (including but not limited to a disk storage, a CD-ROM, an optical storage, etc.) containing program code. Computer-readable storage media include permanent, non-permanent, removable, and non-removable media, and can store information by any method or technology. The information may be computer-readable instructions, data structures, modules of programs, or other data. Examples of computer storage media include, but are not limited to, a phase change memory (PRAM), a static random access memory (SRAM), a dynamic random access memory (DRAM), other types of random access memories (RAM), read-only memories (ROM), electrically erasable programmable read-only memories (EEPROM), flash memories or other memory technologies, read-only compact disc read-only memories (CD-ROM), digital versatile disks (DVD) or other optical storage, magnetic tape cassettes, magnetic tape magnetic disk storage or other magnetic storage devices, or any other non-transmission media, and the computer storage media can be used to store information that can be accessed by computing devices.

Other embodiments will be apparent to those skilled in the art from consideration of the specification. The present specification is intended to cover any variations, uses, or adaptations of the present specification following the general principles of the present specification and including common general knowledge or conventional technical means in the technical field not described in the present specification. The specification and embodiments are exemplary only, and the true scope and spirit of the present specification are indicated by the appended claims.

It should be understood that the present specification is not limited to the precise structure that has been described above and shown in the drawings, and that various modifications and changes can be made without departing from the scope thereof. The scope of the present specification is limited only by the appended claims.

The invention claimed is:

1. A distributed graph embedding method, comprising:
when a preset sampling algorithm is used to perform path sampling on a graph data structure, adding an identification and a current embedding vector of a current sampled vertex to a predefined message data structure, wherein identifications and current embedding vectors of sampled vertices in a sampling process are recorded in the message data structure, and the message data structure is obtained by transfer via a first computing node where a previous sampled vertex is located;
when a data length of the message data structure reaches a window length defined by a word vector algorithm, using the word vector algorithm to calculate an update gradient of an embedding vector of each sampled vertex in an updated message data structure;
based on identifications in the updated message data structure, sending each update gradient to a corresponding vertex respectively, and using update gradients to update the current embedding vectors of the sampled vertices that belong to a second computing node where the current sampled vertex is located; and after a preset convergence condition is met, generating a graph embedding matrix by final embedding vectors of all vertices in the graph data structure.

2. The method according to claim 1, wherein the current embedding vectors of the vertices in the graph data structure are stored in graph vertex data of a plurality of computing nodes where the vertices are located.

3. The method according to claim 1, further comprising:
when the data length of the message data structure does not reach the window length defined by the word vector algorithm, sampling a vertex adjacent to and connected to the current sampled vertex by using the preset sampling algorithm, and sending the updated message data structure to a third computing node where the sampled adjacent vertex is located.

4. The method according to claim 1, wherein an upper limit of the data length of the message data structure is the window length defined by the word vector algorithm, and the method further comprises:
when the data length of the message data structure reaches or is greater than the window length defined by the word vector algorithm, deleting an identification and a current embedding vector of an earliest added sampled vertex in the message data structure.

5. The method according to claim 1, further comprising:
constructing a training sample by using the graph embedding matrix based on a preset task, and training a preset model by using the constructed training sample to obtain a model for processing the preset task.

6. A distributed graph embedding apparatus, comprising:
a processor; and
a memory storing instructions executable by the processor,
wherein the processor is configured to:
add an identification and a current embedding vector of a current sampled vertex to a predefined message data structure when a preset sampling algorithm is used to perform path sampling on a graph data structure, wherein identifications and current embedding vectors of sampled vertices in a sampling process are recorded in the message data structure, and the message data structure is obtained by transfer via a first computing node where a previous sampled vertex is located;
use a word vector algorithm to calculate an update gradient of an embedding vector of each sampled vertex in an updated message data structure when a data length of the message data structure reaches a window length defined by the word vector algorithm;
send each update gradient to a corresponding vertex, respectively, based on identifications in the updated message data structure, and use update gradients to update the current embedding vectors of the sampled vertices that belong to a second computing node where the current sampled vertex is located; and
generate a graph embedding matrix by final embedding vectors of all vertices in the graph data structure after a preset convergence condition is met.

7. The apparatus according to claim 6, wherein the current embedding vectors of the vertices in the graph data structure are stored in graph vertex data of a plurality of computing nodes where the vertices are located.

8. The apparatus according to claim 6, wherein the processor is further configured to:
sample a vertex adjacent to and connected to the current sampled vertex by using the preset sampling algorithm when the data length of the message data structure does not reach the window length defined by the word vector algorithm; and
send the updated message data structure to a third computing node where the sampled adjacent vertex is located.

9. The apparatus according to claim 6, wherein an upper limit of the data length of the message data structure is the window length defined by the word vector algorithm, and the processor is further configured to:
delete an identification and a current embedding vector of an earliest added sampled vertex in the message data structure when the data length of the message data structure reaches or is greater than the window length defined by the word vector algorithm.

10. The apparatus according to claim 6, wherein the processor is further configured to:
construct a training sample by using the graph embedding matrix based on a preset task, and train a preset model by using the constructed training sample to obtain a model for processing the preset task.

11. A non-transitory computer-readable storage medium having stored therein instructions that, when executed by a processor of a device, cause the device to perform a distributed graph embedding method, the method comprising:
when a preset sampling algorithm is used to perform path sampling on a graph data structure, adding an identification and a current embedding vector of a current sampled vertex to a predefined message data structure, wherein identifications and current embedding vectors of sampled vertices in a sampling process are recorded in the message data structure, and the message data structure is obtained by transfer via a first computing node where a previous sampled vertex is located;
when a data length of the message data structure reaches a window length defined by a word vector algorithm, using the word vector algorithm to calculate an update gradient of an embedding vector of each sampled vertex in an updated message data structure;
based on identifications in the updated message data structure, sending each update gradient to a corresponding vertex respectively, and using update gradients to update the current embedding vectors of the sampled vertices that belong to a second computing node where the current sampled vertex is located; and
after a preset convergence condition is met, generating a graph embedding matrix by final embedding vectors of all vertices in the graph data structure.

12. The non-transitory computer-readable storage medium 11, wherein the current embedding vectors of the vertices in the graph data structure are stored in graph vertex data of a plurality of computing nodes where the vertices are located.

13. The non-transitory computer-readable storage medium 11, the method further comprising:
when the data length of the message data structure does not reach the window length defined by the word vector algorithm, sampling a vertex adjacent to and connected to the current sampled vertex by using the preset sampling algorithm, and sending the updated message data structure to a third computing node where the sampled adjacent vertex is located.

14. The non-transitory computer-readable storage medium 11, wherein an upper limit of the data length of the message data structure is the window length defined by the word vector algorithm, and the method further comprises:

when the data length of the message data structure reaches or is greater than the window length defined by the word vector algorithm, deleting an identification and a current embedding vector of an earliest added sampled vertex in the message data structure.

15. The non-transitory computer-readable storage medium 11, the method further comprising:

constructing a training sample by using the graph embedding matrix based on a preset task, and training a preset model by using the constructed training sample to obtain a model for processing the preset task.

\* \* \* \* \*